(12) United States Patent
Fox et al.

(10) Patent No.: US 10,764,385 B2
(45) Date of Patent: Sep. 1, 2020

(54) DYNAMIC ONLINE GROUP ADVISOR SELECTION

(71) Applicant: International Business Machines Corporation, Armonk, NY (US)

(72) Inventors: Jeremy R. Fox, Georgetown, TX (US); Trudy L. Hewitt, Cary, NC (US); Liam S. Harpur, Dublin (IE); John Rice, Tramore (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/058,027

(22) Filed: Aug. 8, 2018

(65) Prior Publication Data

US 2020/0053174 A1 Feb. 13, 2020

(51) Int. Cl.
*H04L 29/08* (2006.01)
*H04L 12/58* (2006.01)

(52) U.S. Cl.
CPC .............. *H04L 67/22* (2013.01); *H04L 51/32* (2013.01); *H04L 67/16* (2013.01)

(58) Field of Classification Search
CPC .......... H04L 67/16; H04L 67/22; H04L 51/32
USPC ........................................................ 709/224
See application file for complete search history.

(56) References Cited

U.S. PATENT DOCUMENTS

| | | | |
|---|---|---|---|
| 9,852,208 B2 * | 12/2017 | Chari | G06F 16/285 |
| 2005/0028191 A1 | 2/2005 | Sullivan | |
| 2006/0048059 A1 * | 3/2006 | Etkin | G06F 16/00 715/745 |
| 2006/0294085 A1 * | 12/2006 | Rose | G06F 16/313 |
| 2008/0243933 A1 * | 10/2008 | Holtzman | G06Q 10/06 |
| 2008/0263610 A1 * | 10/2008 | Murray | G06F 16/40 725/110 |
| 2011/0072039 A1 | 3/2011 | Tayloe | |
| 2011/0219011 A1 * | 9/2011 | Carmel | G06F 16/00 707/749 |
| 2012/0197723 A1 * | 8/2012 | Watfa | G06Q 30/0261 705/14.58 |
| 2012/0197986 A1 * | 8/2012 | Chen | G06O 30/00 709/204 |
| 2012/0259785 A1 * | 10/2012 | Ha | G06Q 50/01 705/304 |
| 2012/0290950 A1 * | 11/2012 | Rapaport | H04L 51/32 715/753 |
| 2014/0162235 A1 * | 6/2014 | Marra | G09B 7/00 434/322 |
| 2014/0237039 A1 | 8/2014 | Bank et al. | |
| 2014/0379729 A1 * | 12/2014 | Savage | H04L 65/403 707/748 |
| 2015/0070516 A1 | 3/2015 | Shoemake | |
| 2015/0100539 A1 | 4/2015 | Chung et al. | |

(Continued)

*Primary Examiner* — James E Springer
(74) *Attorney, Agent, or Firm* — Fabian VanCott; Steven L. Nichols (57) ABSTRACT

Online group advisor selection is described. According to a computer-implemented method, users are formed into an online group. Online group membership is based at least in part on a shared interest in a particular topic. Based on online interactions between members of the group and the online activity of group members, a group advisor is identified from among the members of the online group. Administrative rights over online activity for the group is assigned to the group advisor.

20 Claims, 4 Drawing Sheets

(56) References Cited

U.S. PATENT DOCUMENTS

2015/0302335 A1    10/2015   Unda
2016/0071161 A1*   3/2016   Kim .................. G06Q 30/0269
                                                                                     705/14.66
2017/0279905 A1*   9/2017   Shah ...................... H04L 67/22

* cited by examiner

DYNAMIC ONLINE GROUP ADVISOR SELECTION

BACKGROUND

The present invention relates to the management of online groups, and more specifically to the dynamic selection of a group advisor for the online group. Such a selection is based on interactions between members of the group and on the individual online activity of each member of the group. Through an online group, likeminded individuals may converse, learn, share ideas, and otherwise interact with each other and with subject matter relevant to a shared interest. For example, users in an automotive social collaboration site may share ideas relating to car repair, discuss classic automobiles, and post articles and other online subject matter related to automobiles.

SUMMARY

According to an embodiment of the present invention, a computer-implemented method for selecting a group advisor from among an online group is described. According to the method, users are formed into an online group. Online group membership is based at least in part on a shared interest in a particular topic. Based on online interactions between members of the group and the online activity of individual group members, a group advisor is selected from among the members of the online group. Administrative rights over the online activity for the group are then assigned to the group advisor.

The present specification also describes a system. The system includes a group former to form users into an online group. Group membership is based at least in part on a shared interest in a particular topic. A data collector of the system collects data about 1) online interactions between members of the group and 2) online activity for each member of the group. A selector then selects, based on an analysis of the online interactions between members of the group and the online activity of each member of the group, a group advisor from among the members of the online group. A controller assigns administrative rights over online activity for the group to the group advisor.

The present specification also describes a computer program product. The computer program product includes a computer readable storage medium having program instructions embodied therewith. The program instructions are executable by a processor to cause the processor to form users into an online group, wherein online group membership is based at least in part on an interest in a particular topic, determines communication guidelines for the online group, and identifies activity patterns that are contrary to the communication guidelines for the online group. Program instructions are also executable by the processor to identify a group advisor from among the members of the online group based on 1) online interactions between members of the group, 2) online activity of each group members, and 3) activity patterns contrary to the communication guidelines. The program instructions then are executable by the processor to assign administrative rights over online activity for the group to the group advisor.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Electronic devices have provided new and developing methods of communication. For example, social media platforms and other online forums provide users with ways to communicate directly with a particular group of individuals. For example, via different online forums, users interested in a particular topic may come together to correspond about their shared interest. While such electronic forums have undoubtedly expanded communication possibilities and have provided a mechanism for like-minded individuals to engage in discussion, some aspects may reduce their effectiveness.

For example, there may be particular members within the online group that are trend leaders. That is, they may be more informed about the topic, may express views that are generally reflective of the group, have positive interactions with other members of the group, and who may communicate in a way that is positively received by other members of the group. These leader's voices, which may be particularly relevant to the topic around which the online group was formed, may be drowned out in the multitude of individuals within the group. Another concern is that data access and control over the group sharing may go unchecked such that certain members of the group may post inappropriate, negative, or other content that is detrimental to the group.

Accordingly, the present specification describes methods and systems for dynamically selecting a group advisor from among the members of the group. The communications within the group may then prioritize the group advisor such that their influential and respected opinions may be highlighted. Moreover, certain administrative rights may be granted to the group advisor such that data content within the group is regulated to prevent inappropriate, malicious, negative, or otherwise undesirable content from being presented in the online communications. That is, the group advisor is granted certain administrative rights, thus offloading it from a server, such that online content can be filtered.

As used in the present specification and in the appended claims, the term "a number of" or similar language is meant to be understood broadly as any positive number including 1 to infinity.

Figure 1:
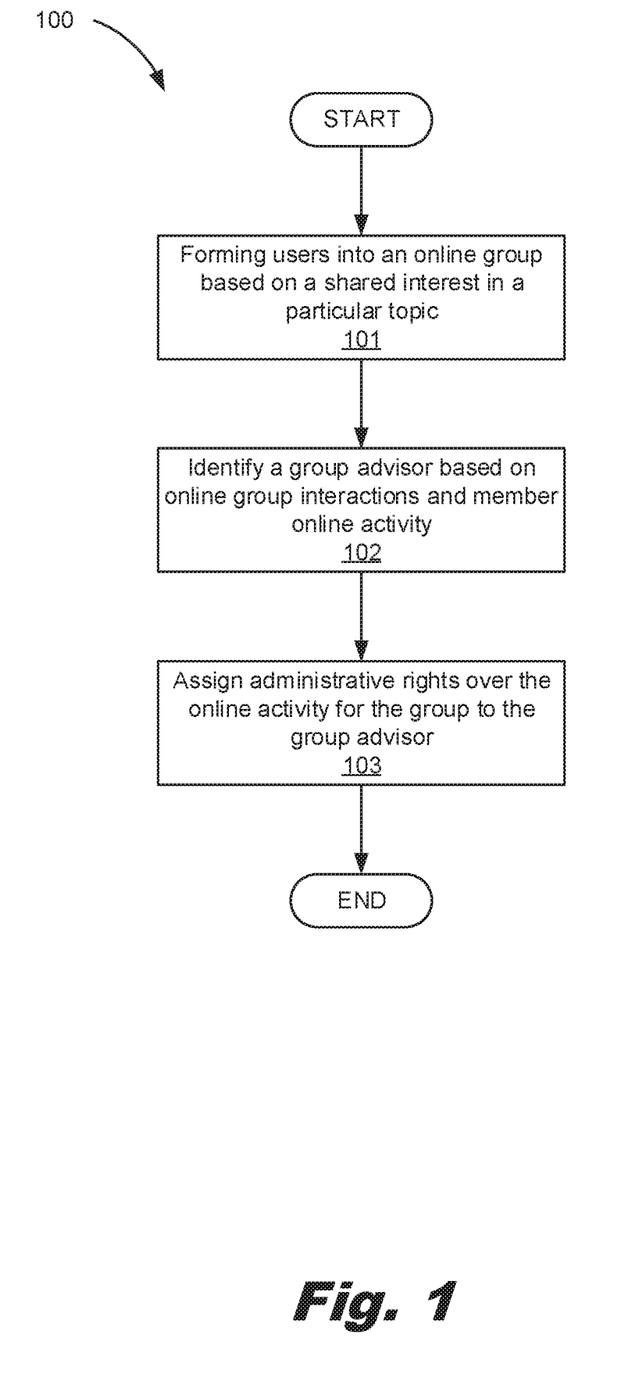
FIG. 1 depicts a flowchart of a method for dynamic group advisor selection, according to an example of the principles described herein.

Turning now to the figures, FIG. 1 depicts a flowchart of a method (100) for dynamic group advisor selection, according to an example of the principles described herein. According to the method, users are formed (block 101) into an online group. Users may be formed into groups based on any number of criteria. For example, the online group may be formed of users that share an interest in a particular topic. As a specific example, an online group may be formed relating to classic automobiles. Formation of the group may be based on user selection. That is, users may select to be associated with this group and participate in the communications therein. In some examples, formation (block 101) of an online group may be dynamic and performed without user involvement. For example, in addition to interest in a particular topic, users may be formed (block 101) into an online group based on other criteria such as physical proximity and social network connection. For example, beyond a shared interest in classic automobiles, users may be formed (block 101) into an online group if profile data, or data collected from user computing devices, indicates that the users are within a threshold physical distance from one another.

Such online group formation (block 101) may also be based on social network connection. For example, users in a first set who are interconnected on a social media platform and share an interest in the particular topic may be formed into a first group while a second set of users that are interconnected and share a similar interest in the particular topic may be formed into a second group.

Figure 2:
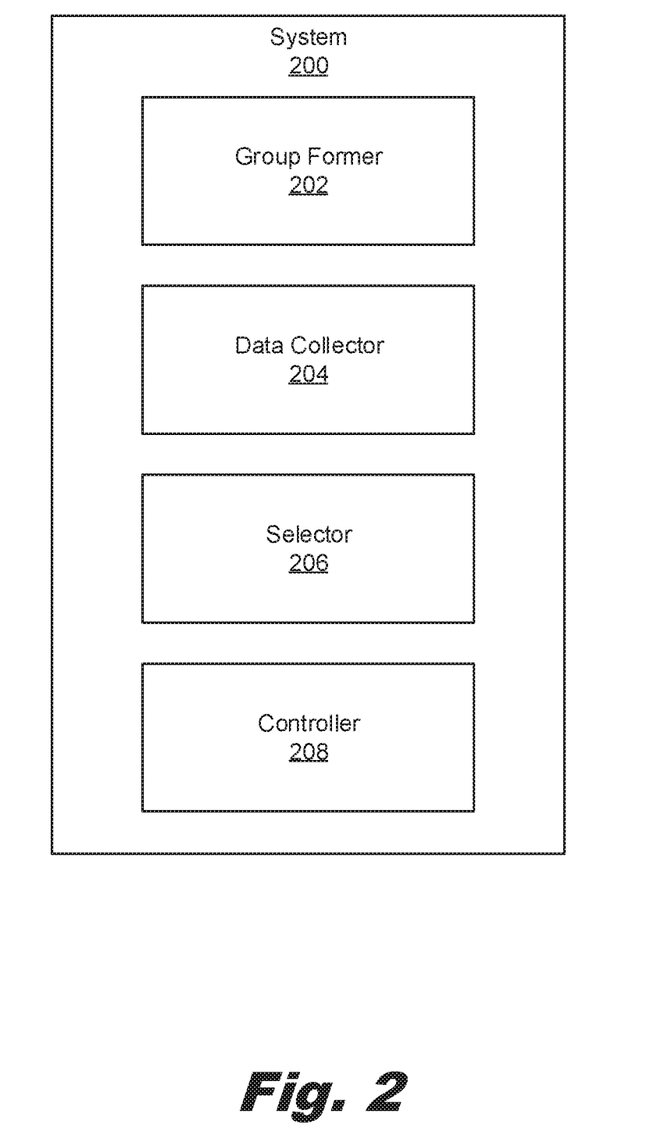
FIG. 2 depicts a system for dynamic group advisor selection, according to an example of principles described herein.

As yet another example, formation (block 101) of online groups may be selected based on online activity. That is, analytics may be performed on the websites visited by a user, articles read by a user, and videos viewed by a user, among other online content consumed by a user. Metadata relating to these visits can be recorded and data-mined to indicate a particular interest for the user. For example, a user may frequent a particular hobby site, view videos relating to the hobby, and read articles related to the hobby. Accordingly, a system as indicated in FIG. 2, may ascertain that the user has an interest in the hobby and may form (block 101) the user, along with other users with a shared interest in the hobby, into an online group. In one particular example, a latent class model may be used to form (block 101) the online group. In latent class modeling, unobservable subgroups of a population are identified. Such latent classes may be the basis of the online group formation (block 101). In other words, the online group may refer to a group of users that are either stationary or mobile and that share characteristics, behaviors, or interests with other users that are above a threshold degree such that they are bound together and designated as an online group.

A group advisor is then identified (block 102) from among the members of the group. The group advisor refers to a user that is particularly pertinent to the ideas and information exchanged within the group. This pertinence may be quantified by considering any number of factors. In some examples, such a user may be relied on to change a sentiment within the group and to monitor the communication dynamics within the group. For example, as will be described below, the group advisor may be relied on to provide a content filtering effect, thus offloading such a responsibility from a hardware server. Moreover, the group advisor may ensure compliance with other communication protocols within the group, again offloading such operations from a hardware component, thus freeing up bandwidth on a computing device and increasing the speed of the computing device. In some examples, such processing to ensure compliance with communication protocols and provide the content filtering effect may be performed on a server device, thus saving power consumption and battery life on a computing device for the user.

The group advisor may be identified (block 102) based on any number of factors. One such factor is the online interaction between members of the group. That is, within an online group, members generate original posts, comment on other member posts, and re-share posts from other members. These interactions and the context of such interactions can be indicative of whether or not a particular member is influential within the online group. That is, as described above, the group advisor is a user whose opinions and posts are well-received by others and whose opinions may be reflective of the online group. Accordingly, the system depicted in FIG. 2 may evaluate online interactions between the different group members in identifying (block 102) and selecting the group advisor.

For example, the system of FIG. 2 may consider such things as online communications between members of the group. Specifically, a natural language processor and/or sentiment analyzer of the system may analyze the corpus of posts, comments, and other messages shared within the online group to determine a context and sentiment both of posts by members and responses by other members to those posts. For example, a particular member may generally publish negative posts, or publish posts that receive negative responses from other member. These types of posts and responses may weigh against a member being selected as a group advisor. In yet another example, a particular member may frequently comment negatively on other member posts. Again, such an activity pattern may weigh against selecting that particular member as a group advisor. By comparison, a particular member that publishes positive posts and/or publish posts that receive positive responses from others may weight toward selecting that individual as a group advisor.

Other examples of interactions between members that may be considered when identifying (block 102) a group advisor include the comments members make on other members posts. Positive responses to another member post may foster a collaborative and desirable communication dynamic within the online group that would weigh towards selection of a particular member as a group advisor.

Another data point that can be considered in identifying (block 102) and selecting a group advisor, may relate to the original posts of members. Both in the quantity and in the re-shares. That is, a member may frequently make original posts. Depending upon the accuracy, credibility, and reception of those original posts, a member may be more or less likely to be selected as a group advisor. Still further, how often other members of the group share the member's original post may also indicate how that original poster's opinion is considered by other members of the group. Yet another factor is how much a particular member re-posts original posts by other members. Doing so may be indicative of a particular member's involvement in the group as well as their level of dedication to the particular topic around which the group is formed.

In yet another example, a rating of the member may be relied on in selecting a group advisor. That is, the social networking site, or online group may provide a way to rate members in a variety of ways, for example to rate the member, or to rate the comments, posts, responses, etc. made by that member.

In this example, as described above, a system may include a data collector that collects data indicative of the various online interactions (i.e., posts, shares, comments, etc.) described above. The data may be gathered and analyzed to determine trends or activity patterns of various members within the group. This data may be extracted and relied on in selecting the group advisor.

In addition to the online interactions within the group, the online activity of each member may also be relied on in identifying (block 102) and selecting a group advisor. Various examples are presented below of information that could be collected. In this example, a data collector extracts metadata and analyzes that metadata to identify trends that weigh for or against selecting a particular member as a group advisor.

One specific example of member online activity for which metadata is collected is a viewing activity for each member. That is, the data collector may collect information regarding what websites a member has visited and what videos they have viewed. For example, extracted data may indicate that a member frequents a website recognized as credible in its information relating to a particular topic. As yet another example, a member's interaction with the websites may also factor into the identification (block 102) of a group advisor. For example, a user that posts to credible websites, or otherwise features on credible websites, may be selected as a group advisor.

In some examples, a member profile may be consulted. For example, a profile of a member may indicate a member's age and experience related to the topic. Such information may be combined with the other information described herein to select a group advisor. Another example of profile information that may be relied on is the seniority of a member. For example, within an online forum, a user who has been a member for an extended period of time may be indicative of a member that is familiar with the topic and in particular with the communications within the online group. In another specific example, the online group may be centered around a shared interest in project management. Based on profile information, it may be determined that a particular member is a "certified" project manager. Accordingly, this particular member may be selected as the group advisor. In this fashion, a member's profile may allow an inference of superior knowledge relating to the particular topic.

Online activity within the group, but not specifically relating to interactions with other members, may also be considered. One such example are the re-posts by a member of other content, for example content originating from outside the online group. For example, a member may read an article from a credible website and post it to the online group. In this example, such an activity may indicate involvement and knowledge of credible websites such that the member is more likely to be selected as a group advisor. By comparison, a member who does not frequently post outside content into the online group, or who posts outside content that is known as being questionable, may weigh against selection of that member as a group advisor as it is indicative of them not searching out credible online information relating to the topic.

Still to this point, the factual credibility of the content that the members post is considered in determining a group advisor. For example, a member may simply be posting content without considering, or having a knowledge of, the credibility of the associated sources for the content. Accordingly, the data collector may collect metadata such as ratings of the source to determine its credibility. A member exhibiting a pattern of citing content from questionable sources would be less likely to be selected as a group advisor.

Another example of an online activity considered in selecting a group advisor is the originality of the posts by a member. For example, a natural language processor, or other textual analyzer may determine whether what is posted by a member is original content, or regurgitated from another source. Regurgitated content weighs against selection as a group advisor while original content (and how it is received within the group) weighs in favor of selection as a group advisor.

As described above, the identification (block 102) of a group advisor may be based on activity patterns. These activity patterns may be determined based on extracted metadata relating to the activity and/or interactions of a particular member. From an analysis of each of this activity and interaction, activity trends may be identified. These activity trends are considered and adjudicated when selecting a group advisor.

With a group advisor identified (block 102) and selected, certain administrative rights may be assigned (block 103) to the group advisor. More specifically, administrative rights over the online activity of the members within the online group. Such administrative rights are varying and may be of any type. For example, one such administrative right is to restrict access to certain data of the online group. For example, an online group may include tourists who are traveling together to a particular destination. From the members of the group, a group advisor may be selected who has particular knowledge and experience traveling to that particular destination. In this example, the group advisor may be given the administrative right to block certain websites that may be harmful or malicious.

Other examples of administrative rights that can be assigned (block 103) include moderating posts to the online group and managing membership within the group. For example, as described above, certain posts may be questionable, malicious, or otherwise undesirable within an online group. The group advisor may be charged with monitoring these posts. Accordingly, assigning a member as a group advisor offloads computational bandwidth as a hardware server is no longer tasked with filtering content.

Another example of an administrative right that may be assigned is the management of membership within the online group. That is, a group advisor may remove or add users to a particular online group. In this fashion, the group advisor again provides a content filtering function by removing those members prone to post questionable, irrelevant, or malicious content. Yet again, the group advisor being tasked with content management unloads filtering bandwidth that would otherwise be provided by a hardware server, thus improving computer functionality. Such a system also reduces the memory storage as filtered content is not even passed to system memory. Accordingly, the hardware may be made to run more quickly as computational operations are offloaded to the group advisor.

In summary, the group advisor is a user who can guide the communications and information sharing within an online group. As a specific example, the group advisor is one identified to drive a positive sentiment within the online group.

Such a group advisor provides a computing system with enhanced data control by relying on additional pieces of input, i.e., group advisor input, when determining which content should be authorized. Still further, as content and information shared is regulated by a group advisor, the actions of the group advisor are relied on by the system to identify more relevant data. That is, by relying on the actions of a trusted group advisor, the system may proactively avoid presenting information that is irrelevant. Accordingly, the system can provide a decluttered and more reliable communication platform.

Even further, assigning a group advisor administrative rights over membership provides a more secure online collaboration network as access rights to the group and the information shared therein is regulated more closely.

FIG. 2 depicts a system (200) for dynamic group advisor selection, according to an example of principles described herein. To achieve its desired functionality, the system (200) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. Alternatively, one processor may execute the designated function of each of the components.

The system (200) includes a group former (202). The group former (202) groups users into an online group. As described above, the online group may include users that among other criteria, share an interest in a particular topic. Accordingly, the group former (202) using online analytics may determine that a user has a particular interest in a topic. That is, the group former (202) may include online analytic tools that determine what websites a user has accessed, what videos a user has watched, and what articles a user has read. Using metadata from all these sources, the group former (202) may identify users with shared interests and group them as an online group. In similar fashion, the group former (202) may consider other pieces of information such as social network connectedness and physical proximity when forming an online group of users.

The system (100) also includes a data collector (204) to collect data relating to each member within an online group. Specifically, the data collector (204) collects information relating to online interactions between the members of the online group. Such information may include the content, context, and sentiment of members original posts, comments to others posts, and comments received by others to their posts. In this example, the data collector (204) may include a sentiment analyzer, natural language processor, or other textual analysis tool to determine a positive or negative tone to each of the above noted communications. Still further, the data collector (204) collects data relating to ratings of the members, likes of their posts, their likes of other member posts as well as other online activity of the user such as visits to credible websites relating to the particular topic and/or integration with the website related to the particular topic etc.

As one particular example, the data collector (204) may classify each member of the online group based on experience regarding the particular topic. That is, the data collector (204) by analyzing an online activity related to the topic, as identified by metadata associated with different online actions of the user, as well as considering profile information for the different members, may ascertain a level of experience or knowledge that a particular user has with regards to the particular topic and may use such information in the selection of a group advisor.

Using such information a selector (206) selects, based on an analysis of the online interactions between members and the online activity for each member, a group advisor from among the members of the online group. That is, each piece of collected data weighs one way or another regarding a member's suitability to be an influencer within a group. Accordingly, the selector (206) weighs and considers all the data and/or metadata to select a user as a group advisor who will be entrusted with handing moderation of communications and communication protocols within the online group.

In some examples, once selected as a group advisor, that member's interaction within the online group may be more heavily weighed. For example, posts, comments, or re-posts by the group advisor may be more prominently displayed, or indicated with an icon identifying the communication as being associated with the group advisor. Doing so may present a beneficial delivery of information as it highlights information that may be particularly relevant to group members, i.e., communications from a trusted group advisor.

The system (200) also includes a controller (208). As described above, once a member is selected as a group advisor, they may be assigned certain administrative rights over the online activity within the group. The controller (208) carries out such assignation. This may include designating on metadata associated with a profile of the user, what actions the user can be allowed to execute. Accordingly, user interface options may be made available to a group advisor that were previously unavailable, or that are unavailable to other non-advisor members of the group.

Figure 3:
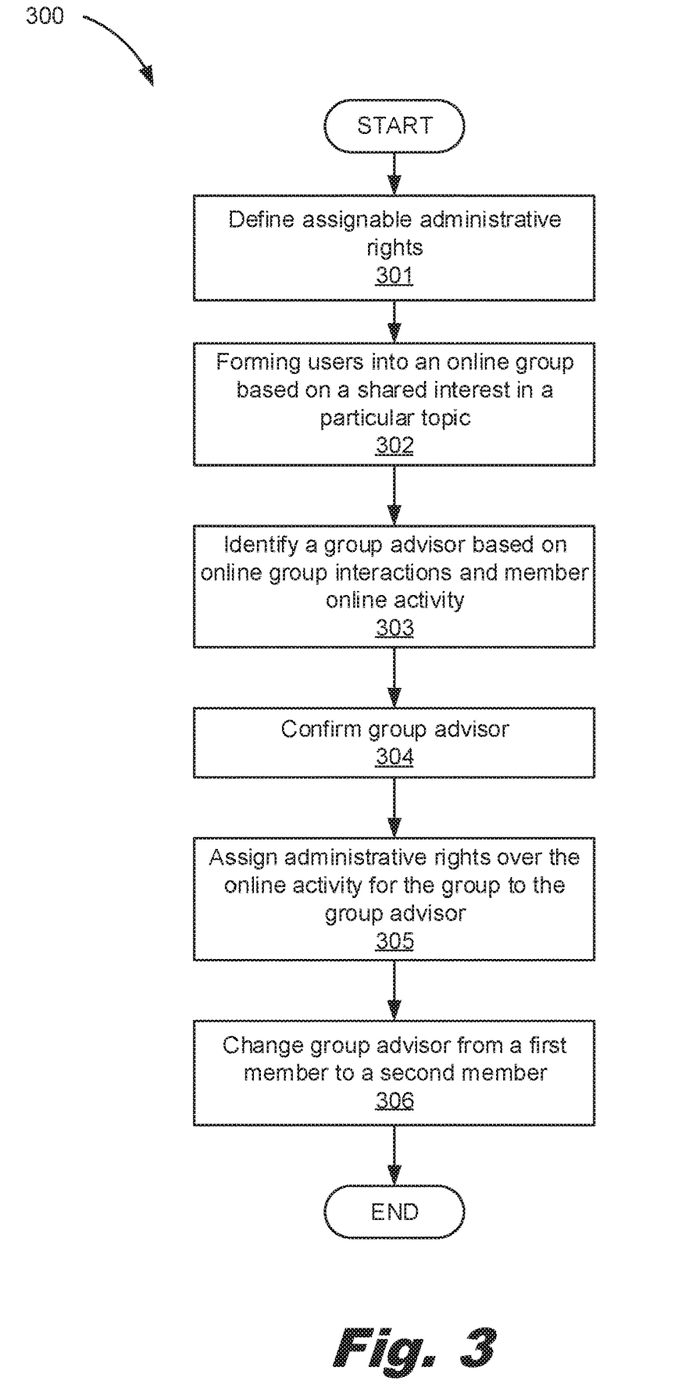
FIG. 3 depicts a flowchart of a method for dynamic group advisor selection, according to another example of principles described herein.

FIG. 3 depicts a flowchart of a method (300) for dynamic group advisor selection, according to another example of principles described herein. According to the method (300), assignable administrative rights are defined (block 301). For example, while it may be desirable to assign certain administrative rights, it may also be desirable to retain other administrative rights from being changed by anybody but an administrator. In some examples, the administrative rights that are assignable are defined by an administrator of the online group. In one specific example, the administrator may be a parental figure for a youth online group. In this example, the parent may set the bounds of what a group leader for the youth online group may change. It may also proscribe additional limitations of the youth online group, such as which websites or content may be shareable on the online group.

In some examples, defining (block 301) assignable administrative rights may be based on input from the members of the online group. That is, the online group as a collection of members may be governed by decisions made by the members. Accordingly, those members may determine what control the group advisor may exert over the other members of the group.

As described above, users are formed (block 302) into an online group based on a shared interest in a particular topic and a group advisor is identified (block 303) from the ranks. These actions may be performed as described above in connection with FIG. 1.

In some examples, the group advisor may be confirmed (block 304), for example via a vote of the remaining members. That is, once it has been determined that a particular member is trusted and a likely candidate as a group advisor, the system (FIG. 2, 200) may generate a user interface prompting the remaining members of the online group to either accept or reject the particular candidate as the group advisor. Such an action by the other members may be used to maintain a particular member as the group advisor. With the group advisor confirmed (block 304), administrative rights over the online activity of the group may be assigned (block 305) to the group advisor. This may be performed as described above in connection with FIG. 1.

In some examples, the method (300) may be iterative and dynamic. That is, over time the dynamics of an online group may change. As an example, at one point in time a first member to a group may not be particularly active in the online group, and/or may not exhibit a significant quantity of online activity related to the particular topic. However, over time this member may acquire more knowledge, become better versed in the context of the online group, and become more active in the online group. Accordingly, at some point in time this member may be the best candidate as a group advisor. Accordingly, in this example of the method (300), the group advisor may be changed (block 306) from a first member to a second member.

The example previously described notes a change in the role of group advisor due to one member being particularly qualified. In another example, the change (block 306) to the group advisor may be based on an existing group advisor becoming less qualified. That is, many factors can be used to identify a group advisor, including but not limited to interactions with other group members, expressing opinions that are liked, shared, and representative of the group as a whole. If the current group advisor begins to falter in these regards, i.e., has negative interactions with other group members, expresses opinions that are disliked, not shared and not representative of the group as a whole, then it may be in the best interest of the group to assign a new group advisor to fill that role. In other words, the computing device functionality is improved by adjusting to the dynamics of online conversation. Without such dynamic change, the system (FIG. 1, 100) may be stagnant and be ill-equipped to handle the ever-changing dynamics of online correspondence.

Figure 4:
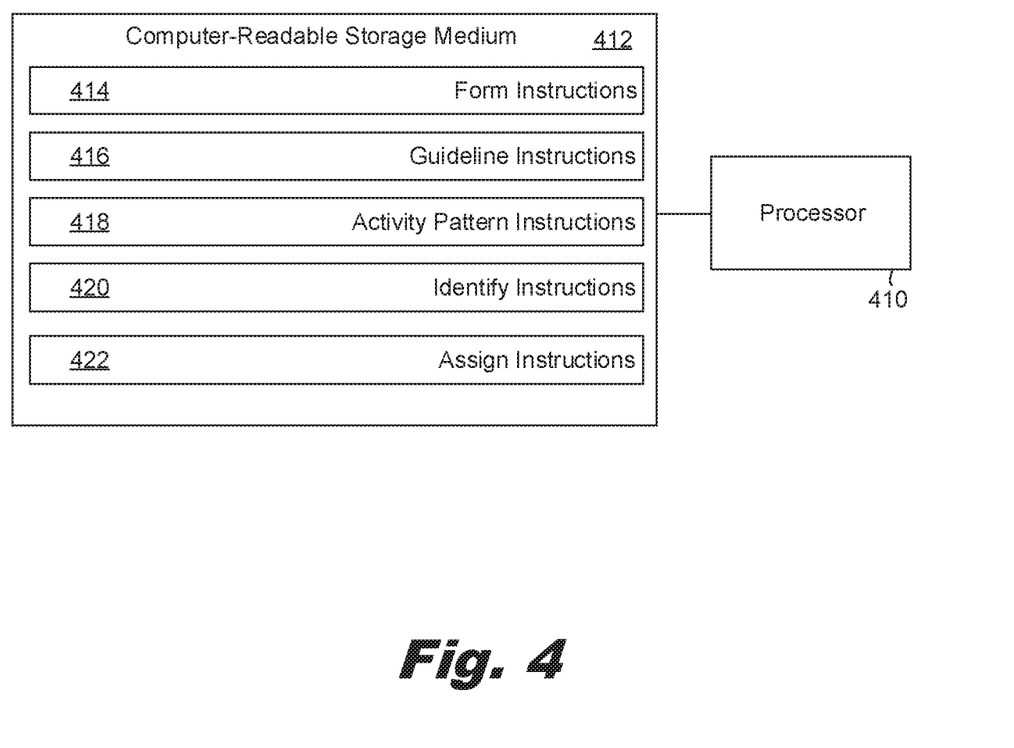
FIG. 4 depicts a computer readable storage medium for dynamic group advisor selection, according to an example of principles described herein.

FIG. 4 depicts a computer readable storage medium (412) for dynamic group advisor selection, according to an example of principles described herein. To achieve its desired functionality, a computing system includes various hardware components. Specifically, a computing system includes a processor (410) and a computer-readable storage medium (412). The computer-readable storage medium (412) is communicatively coupled to the processor (410). The computer-readable storage medium (412) includes a number of instructions (414, 416, 418, 420, 422) for performing a designated function. The computer-readable storage medium (412) causes the processor (410) to execute the designated function of the instructions (414, 416, 418, 420, 422).

Referring to FIG. 4, form instructions (414), when executed by the processor (410), cause the processor (410) to form users into an online group wherein group membership is based at least in part on an interest in a particular topic. Guideline instructions (416), when executed by the processor (410), may cause the processor (410) to determine communication guidelines for the online group. Activity pattern instructions (418), when executed by the processor (410), may cause the processor (410) to, identify activity patterns that are contrary to the communication guidelines for the online group. Identify instructions (420), when executed by the processor (410), may cause the processor (410) to identify, based on online interactions within the group, online activity of group members, and activity patterns contrary to the communication guidelines, a group advisor from among the members of the online group. The identify instructions (420), when executed by the processor (410), may cause the processor (410) to re-assign the group administrator and/or replace the group advisor with a new group advisor. Assign instructions (422), when executed by the processor (410), may cause the processor (410) to assign administrative rights over online activity of the group to the group advisor.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    forming users into an online group by:
        analyzing metadata relating to online content consumed by the users to determine interest in a particular topic; and
        automatically grouping users based at least in part on a shared interest in the particular topic;
    analyzing metadata relating to a credibility of online content consumed by members of the online group;
    identifying, based on online interactions between the members of the online group, online activity of the members of the online group, and the metadata relating to the credibility of online content consumed by the members of the online group, a group advisor from among the members of the online group; and
    assigning administrative rights over online activity for the online group to the group advisor.

2. The computer-implemented method of claim 1, wherein at least one administrative right comprises restricting access to data available to the online group.

3. The computer-implemented method of claim 1, wherein identifying a group advisor is based on activity patterns of the members of the online group.

4. The computer-implemented method of claim 1, wherein identifying a group advisor comprises analyzing, for each member of the online group, at least one of:
    original posts by the member;
    re-posts by other members of the original posts;
    positive responses by other members to the original posts;
    negative responses to the original posts;
    re-posts by the member of other content;
    comments by the member to posts of other members; and
    rating of the member by other members.

5. The computer-implemented method of claim 1, wherein identifying a group advisor further comprises analyzing, for each member of the online group, a sentiment of at least one of:
    original posts by the member; and
    responses by other members to the original posts.

6. The computer-implemented method of claim 1, wherein identifying a group advisor comprises analyzing, for each member of the online group at least one of:
    factual accuracy of original posts by the member;
    seniority;
    age;
    experience related to the particular topic;
    viewing activity;

websites visited; and interaction with websites visited.

7. The computer-implemented method of claim 1, wherein online group membership is based at least in part on at least one of social network connection and physical location.

8. The computer-implemented method of claim 1, further comprising changing a group advisor from a first member of the online group to a second member of the online group based on an analysis of online interactions between the members of the group and online activity of the members of the group.

9. The computer-implemented method of claim 1, further comprising defining administrative rights based on input from members of the online group.

10. The computer-implemented method of claim 1, further comprising confirming the group advisor via a vote by members of the online group.

11. A system comprising:
a group former to form users into an online group by:
analyzing metadata relating to online content consumed by the users to determine interest in a particular topic; and
automatically grouping users based at least in part on a shared interest in the particular topic;
a data collector to collect data comprising:
online interactions between members of the online group;
online activity for each member of the online group;
negative interactions with other members of the online group; and
metadata relating to a credibility of online content consumed by the members of the online group;
a selector to select, based on an analysis of the online interactions between the members of the online group, online activity for each member of the online group, and the metadata relating to the credibility of online content consumed by the members of the online group, a group advisor from among the members of the online group; and
a controller to assign administrative rights over online activity for the online group to the group advisor.

12. The system of claim 11, wherein administrative rights include at least one of:
moderating posts to the online group; and
managing membership within the online group.

13. The system of claim 11, wherein the data collector classifies each member of the online group based on experience regarding the particular topic.

14. The system of claim 11, wherein a group advisor interaction within the online group is more heavily weighted relative to interactions of other members of the online group.

15. The system of claim 11, wherein a group advisor post is prioritized over a post by another member of the online group.

16. A computer program product, the computer program product comprising a non-transitory computer readable storage medium having program instructions embodied therewith, the program instructions executable by a processor to cause the processor to:
form users into an online group by:
analyzing metadata relating to online content consumed by the consumers to determine interest in a particular topic; and
automatically grouping users based at least in part on a shared interest in the particular topic;
determine communication guidelines for the online group;
identify activity patterns that are contrary to the communication guidelines for the online group;
identify a group advisor from among the members of the online group, based on each of:
original posts by the member;
re-posts by other members of the original posts;
positive responses by other members to the original posts;
negative responses to the original posts;
re-posts by the member of other content;
comments by the member to posts of other members;
rating of the member by other members;
factual accuracy of original posts by the member;
seniority;
age;
experience related to the particular topic;
viewing activity;
websites visited;
interaction with websites visited; and
activity patterns contrary to the communication guidelines; and
assign administrative rights over online activity for the online group to the group advisor.

17. The computer program product of claim 16, wherein, a group advisor is identified to drive a positive sentiment within the online group.

18. The computer program product of claim 16, wherein the computer readable storage medium further comprises program instructions executable by the processor to cause the processor to re-assign the group advisor.

19. The computer program product of claim 16, wherein the computer readable storage medium further comprises program instructions executable by the processor to cause the processor to replace the group advisor with a new group advisor.

20. The computer program product of claim 16, wherein the communication guidelines are set by an administrator.

* * * * *